UNITED STATES PATENT OFFICE.

JAMES H. GRAVELL, OF NEW YORK, N. Y.

PAINT.

1,367,597.    Specification of Letters Patent.    Patented Feb. 8, 1921.

No Drawing.    Application filed March 4, 1918.    Serial No. 220,274.

*To all whom it may concern:*

Be it known that I, JAMES H. GRAVELL, a citizen of the United States, residing at New York, in the county of New York and State of New York, have invented certain new and useful Improvements in Paint, of which the following is a specification.

The principal object of the present invention is to provide a rust inhibitive primer or cleaner for iron and steel.

It is well known that the pigment in paint exerts considerable influence on the rust inhibitive properties of the paint, due to the chemical action of the pigment on the metal and on the oils or vehicle of the paint.

Various tests have indicated that bone-black is a very good rust inhibitor. That pigment is composed mostly of an admixture of carbon and calcium phosphate. I have discovered that the rust inhibitive properties of bone-black are due to the presence of calcium phosphate and that they are improved by removing the carbon. This, no doubt, is due to the fact that carbon is electro-negative to the iron and steel and tends to stimulate rusting.

Calcium phosphate is very stable in a neutral atmosphere but it is acted on by acids with the formation of phosphoric acid. Phosphoric acid, however, does not cause iron and steel to rust; on the contrary it is a rust inhibitor, therefore acid vapors of the air, although acting on the calcium phosphate pigment, do not produce any harmful chemicals. The acid vapors in the air which are well known to cause rust, by liberating phosphoric acid, automatically produce a rust inhibitor, which in turn prevents them from having a further rusting effect on the iron or steel.

My invention, broadly considered, therefore consists in interposing between the atmosphere or rusting cause and the metal a strata of material such as calcium phosphate adapted to alter the effect of a rust stimulating environment and produce a rust inhibitive effect.

I have discovered that calcium phosphate can be obtained in a very suitable finely divided condition by precipitating it from solution by means of alcohol. The solution can be made by dissolving bone ash, bone-black, or phosphate rock in sulfuric acid to form hydrocalcium phosphate, or crude phosphoric acid can be used for the purpose as it contains a large quantity of dissolved calcium phosphate. Commercially I prefer to use crude phosphoric acid. In carrying out my process, I add one part by volume of crude commercial phosphoric acid paste, to four parts by volume of denatured alcohol, collect the precipitate, wash it and dry it. It is then ready to be utilized as a pigment. The resulting alcoholic solution of phosphoric acid can be used for the Feidt process of Patent No. 1,109,670, or the alcohol and phosphoric acid can be recovered by distilling off the alcohol.

It is quite evident that a paint consisting of my pigment and an oil vehicle is of value for priming steel or iron so as to prevent them from rusting under the paint.

Since the invention is concerned with the pigment, not necessarily the coloring matter, of the paint rather than with the vehicle, it follows that the vehicle is susceptible of considerable variation, for example according to my invention, calcium phosphate may be added to concrete for the protection of re-inforcements of iron and steel and when this is done the calcium phosphate constitutes, in effect, a layer between the re-inforcements and a rust stimulating environment.

As this invention is of a chemical nature, I desire to claim as my invention not only the chemicals specifically mentioned but also their chemical equivalents, for instance, magnesium phosphate may replace the calcium phosphate and acetone may replace the alcohol.

What I claim is:

1. Paint for preventing iron and steel from rusting which contains calcium phosphate precipitated by alcohol.

2. Paint for preventing iron and steel from rusting which is devoid of any substance electro-negative to iron and steel and which contains calcium phosphate inert in respect to iron and steel and adapted to release phosphoric acid in a corrosive environment, substantially as described.

JAMES H. GRAVELL.